March 4, 1947. S. B. HASELTINE 2,416,691
FRICTION SHOCK ABSORBER
Filed Feb. 4, 1944
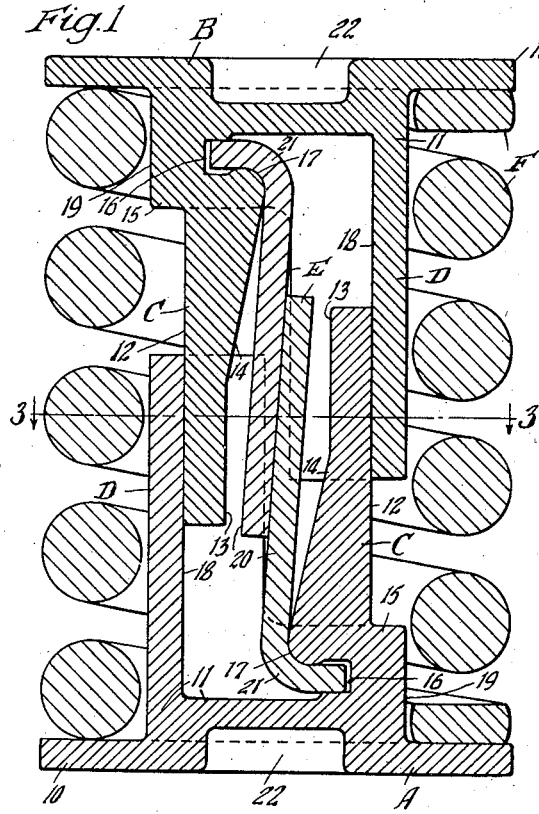
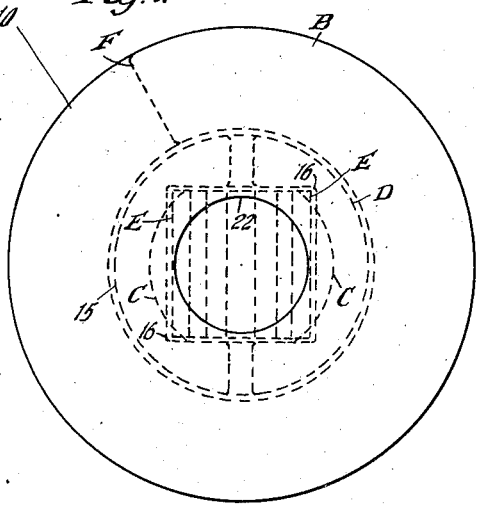
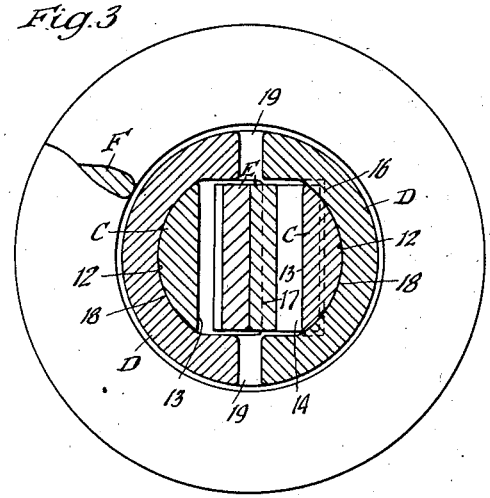
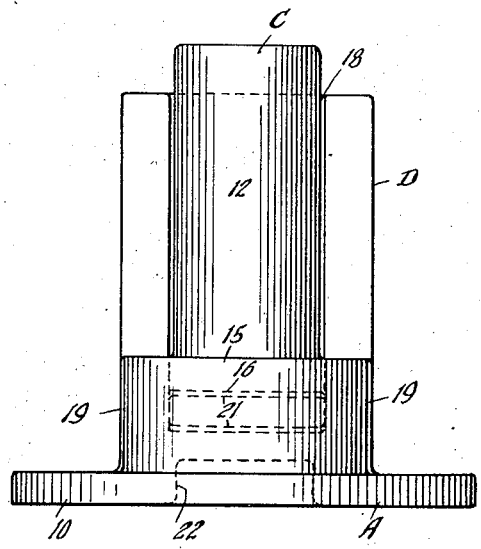
Inventor
Stacy B. Haseltine
By Henry Fuchs
Atty.

Patented Mar. 4, 1947

2,416,691

UNITED STATES PATENT OFFICE 2,416,691

FRICTION SHOCK ABSORBER

Stacy B. Haseltine, La Grange, Ill., assignor to W. H. Miner, Inc., Chicago, Ill., a corporation of Delaware Application February 4, 1944, Serial No. 521,023

17 Claims. (Cl. 267—9)

This invention relates to improvements in friction shock absorbers for railway cars, and more particularly for snubbing the action of truck springs of the same.

One object of the invention is to provide a friction shock absorber comprising relatively movable, interengaging friction members and relatively movable, interengaging friction spring plates, wherein the spring action of the spring plates forces the friction members into tight frictional contact with each other.

A further object of the invention is to provide a mechanism, as set forth in the preceding paragraph, comprising spring means opposing relative longitudinal movement of said friction members and spring plates, which spring means also acts to restore the parts to normal position after compression of the device.

Other objects of the invention will more clearly appear from the description and claims hereinafter following.

In the drawing forming a part of this specification, Figure 1 is a central, transverse, vertical, sectional view of my improved shock absorber. Figure 2 is a top plan view of Figure 1. Figure 3 is a transverse, horizontal, sectional view, corresponding substantially to the line 3—3 of Figure 1. Figure 4 is an elevational view, looking from right to left in Figure 1, of the lower friction element of my improved shock absorber.

My improved shock absorber comprises broadly a pair of relatively movable followers A and B; two friction posts C—C; two friction members D—D; two friction spring plates E—E; and a spring F.

The followers A and B are of identical design, the follower A being disposed at the bottom and the follower B at the top of the mechanism. Each follower is in the form of a disclike plate having a laterally extending, annular, peripheral flange 10 of lesser thickness than the central portion thereof, which comprises a projecting boss 11. The boss 11 of the lower follower A is upstanding, while that of the upper follower B is depending, that is, the upper follower B is inverted with respect to the follower A. As shown in the drawing, the boss 11 of each follower is substantially cylindrical and concentric with said follower.

The posts C—C are of identical design. Each post C has a transversely curved, longitudinally extending, outer surface 12, presenting a substantially cylindrical friction surface. On the inner side, the post C presents a substantially flat, vertically extending face 13 at the outer end thereof and an inclined flat face 14 inwardly of said face 13. The post C is formed integral with the boss 11 of the corresponding follower and has the curved outer friction surface 12 thereof laterally inwardly offset with respect to the base portion, thereby providing a horizontal shoulder or ledge 15. The post C of the follower A extends upwardly from the same and is located at the right hand side of the mechanism, as seen in Figure 1, and the post C of the follower B depends from the same and is located at the left hand side of the mechanism.

As shown most clearly in Figure 1, each post is inwardly slotted at its base on the inner side thereof, as indicated by 16, for a purpose hereinafter described, and the inner side of the post is rounded off, as indicated at 17, outwardly of said slot. The rounded wall portion 17 forms a continuation of the inclined face 14 of the post. The rounded wall 17 of the lower post C is opposed to the lower wall of the slot 16 and protrudes slightly below the upper wall of said slot, whereby the opening of the slot is slightly contracted. The rounded wall 17 of the upper post C is opposed to the upper wall of the slot 16 of said post and protrudes slightly above the lower wall of said slot.

The friction members D—D are of identical design, each member D being in the form a heavy, transversely curved plate formed integral with the corresponding follower and having its transversely curved, outer side in alignment with the vertical wall of the boss 11, the curved outer face of said plate forming a continuation of said vertical wall of the boss. On the inner side, the plate D presents a longitudinally extending, transversely curved, friction surface 18. The transversely curved plate D and the post C of each follower are located at opposite sides of the same, the plate D of the lower follower A being at the left hand side of the same, with the friction surface 18 thereof slidably engaging the friction surface 12 of the upper post C, and the plate D of the upper follower B being at the right hand side of the same, with the friction surface 18 thereof slidably engaging the friction surface 12 of the lower post C.

The side wall portions of each transversely curved plate D, at the base thereof, are connected at their edges to base portions of the corresponding post C by webs 19—19 forming continuations of the wall of said curved plate.

The friction spring plates E—E are also of identical design, said plates being formed of spring steel. Each plate comprises an elongated straight main body portion 20 having a curved hook section 21 at one end. The plates E—E are respectively carried by the upper and lower posts C and C. The upper plate E has the hook 21 thereof anchored in the slot 16 of the upper post C with the straight portion 20 of said plate depending from the follower B, and the lower plate E has the hook 21 thereof anchored in the slot 16 of the lower post C with the straight portion 20 thereof upstanding from the follower A.

The spring friction plates E—E are in face to face contact with each other and flexed outwardly in the assembled condition of the mechanism, thus being inclined with respect to the central vertical axis of the mechanism. Inasmuch as these spring plates are flexed and under tension, their inherent resiliency presses the contacting friction surfaces thereof into close engagement with each other to produce the desired friction therebetween. In addition, the friction spring plates E—E, due to being under tension in their flexed condition, yieldingly force the posts C—C into tight frictional contact with the platelike friction members D—D. As will be evident, the inclined friction spring plates produce a yielding wedging action as the mechanism is compressed to more tightly press together the fraction surfaces of the posts C—C, plate members D—D, and the spring friction plates E—E.

The spring F, which comprises a relatively heavy coil, surrounds the posts C—C and friction members D—D and bears at its top and bottom ends on the followers B and A, respectively.

My improved shock absorber is interposed between the top and bottom spring follower plates of a truck spring cluster of a railway car, preferably replacing one of the spring units of the cluster; however, several of these improved shock absorbers may be employed in a single cluster of truck springs, replacing two or more units of the same.

The spring F is preferably so designed that it is under initial compression when the shock absorber is mounted on the car between the spring plates of the truck spring cluster, and yieldingly resists relative approach of the followers.

To accommodate the shock absorber for use with spring follower plates having centering projections for the springs, the top and bottom followers of the shock absorber are provided with seats 22—22 receiving said projections.

As will be evident from the preceding description taken in connection with the drawings, the device comprises two cooperating spring resisted friction elements, which are identical, each including an end follower, a friction post C and a friction plate member D formed integral with the follower, and a friction spring plate carried by each post, these friction elements being reversely arranged so that the post and friction spring plate of one element have sliding frictional engagement respectively with the friction plate member and the friction spring plate of the other element.

The operation of my improved shock absorber is as follows: Upon the spring cluster of the truck of a railway car being compressed between the spring follower plates of said cluster, the improved shock absorber is compressed therewith, between said follower plates, forcing the followers A and B toward each other against the resistance of the spring F. During relative approach of the followers A and B, the friction posts C slide on the friction members D and the friction spring plates E—E slide on each other, lengthwise of the mechanism. Inasmuch as the friction spring plates E—E are inclined to the vertical, a wedging action is produced during compression of the mechanism, further flexing the plates E—E and forcing the friction surfaces thereof and the friction surfaces of the posts C and friction members D into tight frictional engagement with each other to snub the action of the truck springs. As will be evident, progressively increasing frictional resistance is thus provided by the wedging action of the friction spring plates during the compression of the mechanism.

As the follower plates of the truck springs are separated, due to recoil of the springs, the followers A and B are forced apart, lengthwise of the mechanism, by the expansive action of the spring F, thereby restoring the parts to normal position shown in Figure 1.

As will be further evident, snubbing of the truck springs is also effected during the recoil action of the truck springs, due to the friction surfaces of the friction spring plates, posts, and friction members being pressed together by the spring action of the flexed friction spring plates.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with relatively lengthwise movable pairs of friction elements having cooperating friction surfaces, the elements of each pair being rigid and rigidly connected to each other; of spring means forcing said elements of one pair laterally in one direction and the elements of the other pair laterally in the opposite direction into tight frictional engagement with each other; and spring means opposing relative lengthwise movement of said pairs of elements toward each other.

2. In a friction shock absorber, the combination with a pair of friction elements at one end of the mechanism; of a second pair of friction elements at the other end of the mechanism, said two pairs of elements being movable lengthwise with respect to each other, the elements of each pair being laterally spaced apart and rigidly connected to each other, each pair of elements being displaceable bodily in lateral direction with respect to the elements of the other pair, one element of each pair having a longitudinally extending friction surface on the outer side thereof and the other element of said pair having a longitudinally extending friction surface on the inner side thereof, the friction element of each pair having the outer friction surface being in sliding engagement with the friction element of the other pair having the inner friction surface, said sliding engagement being on said friction surfaces, said friction elements of said two pairs which have the outer friction surfaces being laterally spaced apart; laterally acting spring means forcing said elements into tight frictional engagement with each other; and spring means opposing relative lengthwise movement of said pair of elements toward each other.

3. In a friction shock absorber, the combination with relatively lengthwise movable pairs of friction elements, the elements of each pair being rigid and rigidly connected to each other, each element of each pair having sliding frictional engagement with one only of the elements of the other pair; of laterally acting spring means forcing said elements into tight frictional engagement with each other; and spring means opposing relative lengthwise movement of said pairs of elements toward each other.

4. In a friction shock absorber, the combination with a pair of friction posts, relatively movable toward and away from each other lengthwise of the mechanism; of a friction plate laterally spaced from each post and rigidly connected thereto, said plate of each post being opposed to the other post and having sliding engagement with said post only, said engagement being with the outer side of the latter; laterally acting spring means forcing said posts into tight frictional engagement with said plates; and spring means yieldingly opposing relative movement of said posts and plates toward each other lengthwise of the mechanism.

5. In a friction shock absorber, the combination with a pair of followers movable toward and away from each other; of a pair of laterally spaced, longitudinally extending, rigid, friction elements, rigid with each follower, one element of each pair having sliding engagement with only one element of the other pair; laterally acting spring means forcing said pairs of elements into tight frictional contact with each other; and spring means interposed between said followers and yieldingly opposing relative approach thereof.

6. In a friction shock absorber, the combination with a pair of followers movable toward and away from each other; of a pair of laterally spaced, longitudinally extending, rigid, friction elements projecting from each follower and rigid therewith, one element of each pair having a longitudinally extending friction surface on the outer side thereof and the other element of said pair having a longitudinally extending friction surface on the inner side thereof, the friction element of each pair having the outer friction surface being in sliding engagement only with the friction element of the other pair having the inner friction surface, said sliding engagement being on said friction surfaces; laterally acting spring means forcing said elements into tight frictional engagement with each other; and spring means interposed between said followers opposing movement of said followers toward each other and relative lengthwise movement of said pairs of elements toward each other.

7. In a friction shock absorber, the combination with a pair of followers movable toward and away from each other lengthwise of the mechanism; of a pair of laterally spaced, longitudinally extending, rigid friction elements projecting from each follower and rigid therewith, the elements of each pair having sliding frictional engagement respectively with the elements of the other pair, on correspondingly facing sides of the elements of said other pair; laterally outwardly acting spring means disposed between one of said elements of one pair and one of said elements of the other pair and reacting therebetween to force said elements into tight frictional engagement with each other; and spring means opposing movement of said followers toward each other.

8. In a friction shock absorber, the combination with top and bottom followers; of top and bottom friction posts; top and bottom friction plates, said top friction post and plate being rigid with said top follower, and said bottom friction post and plate being rigid with said bottom follower, the plate of each follower being opposed to the post of the other follower and having lengthwise sliding frictional engagement with the outer side of said post; laterally acting spring means forcing said posts into tight frictional engagement with said plates; and spring means surrounding said posts and plates and bearing at its opposite ends on said top and bottom followers.

9. In a friction shock absorber, the combination with top and bottom followers; of a top friction post depending from said top follower and rigid therewith; a friction post upstanding from said bottom follower and rigid therewith; a friction plate depending from said top follower and rigid therewith, said plate being laterally spaced from said top post; a friction plate upstanding from said bottom follower and rigid therewith, said bottom plate being laterally spaced from said bottom post, each of said posts having a longitudinally extending, transversely rounded, friction surface on the outer side thereof, each of said plates having a transversely curved, longitudinally extending, friction surface on the inner side thereof, the friction surfaces of said top and bottom posts being respectively engaged with the friction surfaces of said bottom and top plates; laterally acting spring means forcing said posts laterally apart into tight frictional contact with the friction surfaces of said plates; and spring means surrounding said posts and plates and bearing at its top and bottom ends on said top and bottom followers and yieldingly resisting relative approach of the latter.

10. In a friction shock absorber, the combination with relatively lengthwise movable pairs of friction elements having cooperating friction surfaces, the elements of each pair being rigid and rigidly connected to each other; of a plate spring anchored to one of the elements of each pair, said plate springs having overlapping engagement with each other and under tension to force said pairs of elements into tight frictional engagement with each other; and spring means opposing relative lengthwise movement of said pairs of elements toward each other.

11. In a friction shock absorber, the combination with relatively lengthwise movable pairs of friction elements, the elements of each pair being rigid and rigidly connected to each other, one element of each pair having a longitudinally extending friction surface on the outer side thereof and the other element of said pair having a longitudinally extending friction surface on the inner side thereof, the friction element of each pair having the outer friction surface being in sliding engagement with the friction element of the other pair having the inner friction surface, said sliding engagement being on said friction surfaces; of interengaging overlapping friction spring plates anchored to said pairs of elements respectively, said friction spring plates being in lengthwise sliding engagement with each other and under tension to hold said plates in tight frictional contact with each other and force said pairs of elements into tight frictional engagement with each other.

12. In a friction shock absorber, the combination with relatively lengthwise movable pairs of friction elements, the elements of each pair being rigid and rigidly connected to each other, the elements of each pair having sliding frictional engagement respectively with the elements of the other pair, on corresponding sides of the elements of said other pair; of interengaging, overlapping friction spring plates anchored to said pairs of elements respectively, said friction spring elements being inclined to the longitudinal central axis of the mechanism and having lengthwise sliding engagement with each other to effect more intimate contact between said plates as the mechanism is compressed and force said pairs of elements into tight frictional engagement with each other; and spring means opposing relative lengthwise movement of said pairs of elements toward each other.

13. In a friction shock absorber, the combination with a pair of friction posts, relatively movable toward and away from each other lengthwise of the mechanism; of a friction plate laterally spaced from each post and rigidly connected thereto, said plate of each post being opposed to the other post and having sliding engagement with the outer side of the latter; a pair of friction spring plates anchored to said posts respectively, said plates being inclined to the longitudinal central axis of the mechanism and having overlapping sliding engagement with each other; and spring means yieldingly opposing relative movement of said posts and plates toward each other lengthwise of the mechanism.

14. In a friction shock absorber, the combination with a pair of followers movable toward and away from each other; of a pair of laterally spaced, longitudinally extending, rigid, friction elements, rigid with each follower, said pairs of elements having lengthwise sliding engagement with each other; a pair of friction spring plates anchored respectively to said followers, said plates being inclined to the longitudinal central axis of the mechanism and having lengthwise sliding engagement with each other; and spring means interposed between said followers and yieldingly opposing relative approach thereof.

15. In a friction shock absorber, the combination with a pair of followers movable toward and away from each other; of a pair of laterally spaced, longitudinally extending, rigid, friction elements projecting from each follower and rigid therewith, one element of each pair having a longitudally extending friction surface on the outer side thereof and the other element of said pair having a longitudinally extending friction surface on the inner side thereof, the friction element of each pair having the outer friction surface being in sliding engagement with the friction element of the other pair having the inner friction surface, said sliding engagement being on said friction surfaces; a pair of friction spring plates anchored respectively to said followers, said plates being inclined to the longitudinal central axis of the mechanism and having lengthwise sliding engagement with each other; and spring means interposed between said followers opposing movement of said followers toward each other and relative lengthwise movement of said pairs of elements toward each other.

16. In a friction shock absorber, the combination with a pair of followers movable toward and away from each other lengthwise of the mechanism; of a pair of laterally spaced, longitudinally extending, rigid friction elements projecting from each follower and rigid therewith, the elements of each pair having sliding frictional engagement respectively with the elements of the other pair, on corresponding sides of the elements of said other pair; a pair of friction spring plates rigidly anchored respectively to said followers, said plates being inclined to the longitudinal central axis of the mechanism and having lengthwise sliding engagement with each other; and spring means opposing movement of said followers toward each other.

17. In a friction shock absorber, the combination with top and bottom followers; of top and bottom friction posts; top and bottom friction elements; top and bottom friction spring plates, respectively anchored to said top and bottom followers, said friction spring plates being inclined to the vertical and having sliding engagement with each other, said top friction post and element being rigid with said top follower, and said bottom friction post and element being rigid with said bottom follower, the element of each follower being opposed to the post of the other follower and having lengthwise sliding frictional engagement with the outer side of said post; and spring means surrounding said posts and elements and bearing at its opposite ends on said top and bottom followers.

STACY B. HASELTINE.

REFERENCES CITED

The following references are of record in the file of this patent:

UNITED STATES PATENTS

| Number | Name | Date |
| --- | --- | --- |
| 488,474 | Gibbs | Dec. 20, 1892 |
| 709,999 | McCord | Sept. 30, 1902 |
| 1,169,863 | Peycke | Feb. 1, 1916 |
| 1,938,715 | Miner | Dec. 12, 1933 |
| 754,594 | McKeen | Mar. 15, 1904 |